US012794667B2

United States Patent
(12)

Kao et al.

(10) Patent No.: US 12,794,667 B2

(45) Date of Patent: Nov. 10, 2026

(54) FULLY HOMOMORPHIC ENCRYPTION COMPUTING METHOD AND SYSTEM, AND NON-TRANSITORY COMPUTER-READABLE MEDIUM THEREFOR

(71) Applicant: Wistron Corporation, New Taipei City (TW)

(72) Inventors: Meng-Chao Kao, New Taipei City (TW); Chiy-Ferng Perng, New Taipei City (TW); Tzu-Chiang Shen, New Taipei City (TW); Cheng-Jhih Shih, New Taipei City (TW); Shih-Hao Hung, New Taipei City (TW); Ching-Wen Chen, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 83 days.

(21) Appl. No.: 18/954,877

(22) Filed: Nov. 21, 2024

(65) Prior Publication Data

US 2026/0058792 A1 Feb. 26, 2026

(30) Foreign Application Priority Data

Aug. 22, 2024 (TW) ................................ 113131677

(51) Int. Cl.

| | |
|---|---|
| ***H04L 9/00*** | (2022.01) |
| ***H04L 9/40*** | (2022.01) |
| *G06F 17/00* | (2019.01) |
| *G06F 21/60* | (2013.01) |

(52) U.S. Cl.

CPC .......... *H04L 9/008* (2013.01); *H04L 63/0876* (2013.01); *G06F 17/00* (2013.01); *G06F 21/602* (2013.01)

(58) Field of Classification Search

CPC ..... H04L 9/008; H04L 63/0876; G06F 17/00; G06F 21/602

See application file for complete search history.

(56) References Cited

U.S. PATENT DOCUMENTS

| | | | | |
|---|---|---|---|---|
| 11,003,429 | B1 * | 5/2021 | Zejda | G06F 8/445 |
| 2017/0293913 | A1 | 10/2017 | Gulak et al. | |
| 2019/0007196 | A1 | 1/2019 | Malluhi et al. | |
| 2020/0076570 | A1 * | 3/2020 | Musuvathi | G06F 21/72 |
| 2021/0255902 | A1 * | 8/2021 | Soon-Shiong | G06F 9/5027 |
| 2023/0119283 | A1 | 4/2023 | Shaul et al. | |

(Continued)

OTHER PUBLICATIONS

Examination report dated Mar. 5, 2026 listed in related U.S. Appl. No. 18/657,718.

(Continued)

*Primary Examiner* — Ellen Tran

(74) *Attorney, Agent, or Firm* — McClure, Qualey & Rodack, LLP

(57) ABSTRACT

A fully homomorphic encryption computing method includes: receiving a homomorphic encryption application; converting the homomorphic encryption application into a data flow graph; and performing a resource scheduling on the data flow graph according to connection relationships of a plurality of processing modules and an execution time to produce a scheduled result. The processing modules have at least two heterogeneous processor types.

17 Claims, 12 Drawing Sheets

(56) References Cited

U.S. PATENT DOCUMENTS

| | | | | |
|---|---|---|---|---|
| 2023/0281069 | A1* | 9/2023 | Goska | G06F 11/3006 714/37 |
| 2023/0318829 | A1 | 10/2023 | Sim et al. | |
| 2024/0413995 | A1 | 12/2024 | Bisheh Niasar et al. | |

OTHER PUBLICATIONS

Cheng-Jhih Shih et al., A Heterogeneous Computing Framework for Accelerating Fully Homomorphic Encryption, The 7th International Conference on Mobile Internet Security (MobiSec'23), Dec. 19-21, 2023, Okinawa, Japan, Article No. 41.
Examination report dated Sep. 3, 2024, listed in related Taiwan patent application No. 113107218.
Examination report dated Nov. 8, 2024, listed in related Taiwan patent application No. 113131677.

* cited by examiner

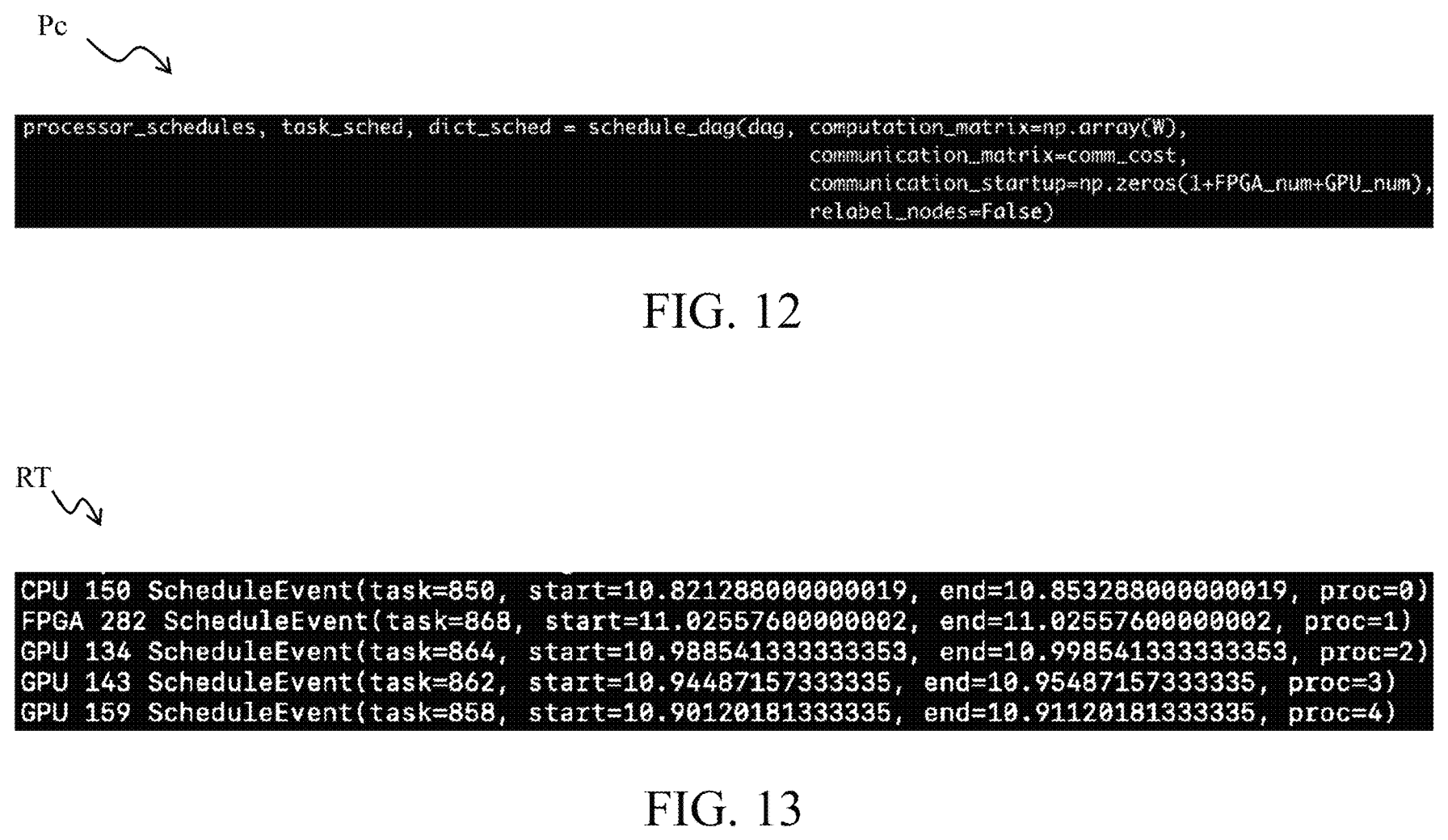

Pc

```
processor_schedules, task_sched, dict_sched = schedule_dag(dag, computation_matrix=np.array(W),
                                                                communication_matrix=comm_cost,
                                                                communication_startup=np.zeros(1+FPGA_num+GPU_num),
                                                                relabel_nodes=False)
```

FIG. 12

RT

```
CPU 150 ScheduleEvent(task=850, start=10.821288000000019, end=10.853288000000019, proc=0)
FPGA 282 ScheduleEvent(task=868, start=11.02557600000002, end=11.02557600000002, proc=1)
GPU 134 ScheduleEvent(task=864, start=10.988541333333353, end=10.998541333333353, proc=2)
GPU 143 ScheduleEvent(task=862, start=10.94487157333335, end=10.95487157333335, proc=3)
GPU 159 ScheduleEvent(task=858, start=10.90120181333335, end=10.91120181333335, proc=4)
```

FIG. 13

FULLY HOMOMORPHIC ENCRYPTION COMPUTING METHOD AND SYSTEM, AND NON-TRANSITORY COMPUTER-READABLE MEDIUM THEREFOR

CROSS-REFERENCE TO RELATED APPLICATION

This non-provisional application claims priority under 35 U.S.C. § 119 (a) to patent application No. 113131677 filed in Taiwan, R.O.C. on Aug. 22, 2024, the entire contents of which are hereby incorporated by reference.

BACKGROUND

Technical Field

The present disclosure relates to a fully homomorphic encryption (FHE) data computing technology, in particular to a fully homomorphic encryption computing method and system, and a non-transitory computer-readable medium therefor.

Related Art

In recent years, the development of a fully homomorphic encryption (FHE) technology has attracted widespread attention. The fully homomorphic encryption technology allows data computing in an encrypted state, thus protecting the privacy of sensitive information. However, the application of the fully homomorphic encryption technology has long been restricted by computing efficiency, especially when processing large-scale data (for example, computationally intensive tasks), the huge computing cost of the technology limits the application thereof in practical scenarios.

SUMMARY

In view of this, the present disclosure provides a fully homomorphic encryption (FHE) computing method and system, and a non-transitory computer-readable medium therefor, which provide an efficient and secure heterogeneous computing framework to achieve efficient, secure and scalable fully homomorphic computing.

In some embodiments, a fully homomorphic encryption computing system includes a compiler, a plurality of processing modules and a task scheduler. The processing modules are coupled to the compiler, and have at least two heterogeneous processor types. The compiler is configured to receive a homomorphic encryption application and convert the homomorphic encryption application into a data flow graph. The task scheduler is coupled to the compiler, and is configured to perform a resource scheduling on the data flow graph according to execution times and connection relationships of the processing modules to produce a scheduled result.

In some embodiments, the fully homomorphic encryption computing system further includes a parameter configuration unit. The parameter configuration unit is coupled to the compiler, and is configured to store a plurality of homomorphic encryption parameters. The compiler is configured to convert the homomorphic encryption application into the data flow graph according to the homomorphic encryption parameters.

In some embodiments, the parameter configuration unit is further coupled to the task scheduler, and the task scheduler is configured to assign the processing modules to tasks of the data flow graph according to the connection relationships of the processing modules, the execution times of the processing modules and the homomorphic encryption parameters to produce the scheduled result.

In some embodiments, the fully homomorphic encryption computing system further includes a message configuration unit. The message configuration unit is coupled to the task scheduler, and is configured to store time cost information and communication bandwidth information. The time cost information records the execution times of processing modules with various processor types for various instructions at various levels. The communication bandwidth information records a bandwidth between any two processing modules with different processor types among the processing modules with the heterogeneous processor types. The task scheduler is configured to perform the resource scheduling for the processing modules according to the data flow graph, the time cost information and the communication bandwidth information.

In some embodiments, the heterogeneous processor types are selected from at least two units of the group consisting of a central processing unit (CPU) type, a graphics processing unit (GPU) type, a data processing unit (DPU) type, a vision processing unit (VPU) type, a tensor processing unit (TPU) type, a field-programmable gate array (FPGA) type, an application specific integrated circuit (ASIC) type, a complex instruction set computer (CISC) type, and a reduced instruction set computer (RISC) type.

In some embodiments, the processing modules include an FPGA processing module, and the FPGA processing module includes an FPGA accelerator and an instruction scheduler. The instruction scheduler is coupled between the compiler and the FPGA accelerator and/or between the task scheduler and the FPGA accelerator. The instruction scheduler is configured to perform an instruction scheduling of the FPGA accelerator according to the data flow graph or the scheduled result.

In some embodiments, the fully homomorphic encryption computing system further includes a parameter configuration unit and a backend configuration unit. The parameter configuration unit is coupled to the instruction scheduler, and is configured to store a plurality of homomorphic encryption parameters. The backend configuration unit is coupled to the instruction scheduler, and is configured to store a plurality of hardware settings. The instruction scheduler is configured to perform the instruction scheduling according to the homomorphic encryption parameters and the hardware settings.

In some embodiments, the processing modules further include a CPU accelerator, a GPU accelerator or a combination thereof, which is coupled to the compiler and/or the task scheduler.

In some embodiments, the fully homomorphic encryption computing system further includes a computing simulator. The computing simulator is coupled to the task scheduler, and is configured to simulate the processing modules to jointly execute the scheduled result to produce a simulated result. The task scheduler is further configured to perform the resource scheduling on the data flow graph again according to the connection relationships of the processing modules, the execution times of the processing modules and the simulated result to produce another scheduled result.

In some embodiments, a fully homomorphic encryption computing method includes: receiving a homomorphic encryption application; converting the homomorphic encryption application into a data flow graph; and performing a resource scheduling on the data flow graph according to connection relationships of processing modules and execution times of the processing modules to produce a scheduled result. The processing modules have at least two heterogeneous processor types.

In some embodiments, the fully homomorphic encryption computing method further includes: jointly executing, by the processing modules, tasks of the scheduled result.

In some embodiments, the processing modules include an FPGA processing module, and the FPGA processing module includes an instruction scheduler and an FPGA accelerator. The step of jointly executing, by the processing modules, the tasks of the scheduled result includes: performing, by the instruction scheduler, instruction scheduling of the FPGA accelerator on a first number of tasks among the tasks according to the scheduled result; and executing, by the FPGA accelerator, the first number of tasks according to the instruction scheduling.

In some embodiments, the step of performing, by the instruction scheduler, the instruction scheduling of the FPGA accelerator on the first number of tasks among the tasks according to the scheduled result includes: reading out homomorphic encryption parameters pre-configured and hardware settings; and performing, by the instruction scheduler, the instruction scheduling on the first number of tasks according to the homomorphic encryption parameters and the hardware settings.

In some embodiments, the processing modules further include a CPU accelerator. The step of jointly executing, by the processing modules, the tasks of the scheduled result further includes: executing, by the CPU accelerator, a second number of tasks among the rest of tasks according to the scheduled result.

In some embodiments, the processing modules further include a GPU accelerator, and the step of jointly executing, by the processing modules, the scheduled result further includes: executing, by the GPU accelerator, a third number of tasks among the rest of tasks according to the scheduled result.

In some embodiments, the fully homomorphic encryption computing method further includes: simulating the processing modules to jointly execute the scheduled result to produce a simulated result; and performing the resource scheduling on the data flow graph again according to the connection relationships of the processing modules, the execution times of the processing module and the simulated result to produce another scheduled result.

In some embodiments, the step of converting the homomorphic encryption application into the data flow graph includes: reading out homomorphic encryption parameters pre-configured; and converting the homomorphic encryption application into the data flow graph according to the homomorphic encryption parameters.

In some embodiments, the step of converting the homomorphic encryption application into the data flow graph according to the homomorphic encryption parameters includes: converting multiplication or addition computing between tensors in the homomorphic encryption application into elementwise multiplication or addition computing of vectors according to the homomorphic encryption parameters to obtain the data flow graph.

In some embodiments, the data flow graph comprises of task nodes, the step of performing the resource scheduling on the data flow graph according to the connection relationships of the processing modules and the execution times of the processing modules to produce the scheduled result includes: producing task cost information of the data flow graph according to time cost information; producing a weighted data flow graph according to communication bandwidth information and the data flow graph; converting the communication bandwidth information into a data matrix; and allocating the processing modules with the heterogeneous processor types for the task nodes of the data flow graph based on the task cost information, the weighted data flow graph and the data matrix to obtain the scheduled result. The time cost information records the execution times of the processing modules with various processor types for various instructions at various levels, and the task cost information records the execution times for executing the task nodes by each of the processing modules with the heterogeneous processor types. The communication bandwidth information records a bandwidth between any two processing modules with different processor types among the processing modules with the heterogeneous processor types, and the weighted data flow graph includes all task nodes and a transmission time between each task node and the adjacent task node among the task nodes.

In some embodiments, a non-transitory computer-readable medium stores at least one program so that a computer loads and executes the at least one program to implement the foregoing fully homomorphic encryption computing method.

In summary, according to any embodiment, the fully homomorphic encryption computing method, the fully homomorphic encryption computing system or the non-transitory computer-readable medium therefor is applied to support multi-platform heterogeneous computing, thereby ensuring that efficient FHE computing can be implemented in different scenarios.

BRIEF DESCRIPTION OF THE DRAWINGS

FIG. 12 is a schematic diagram of an HEFT algorithm according to an embodiment.

FIG. 13 is a schematic diagram of a simulated result according to an embodiment.

DETAILED DESCRIPTION

Figure 1:
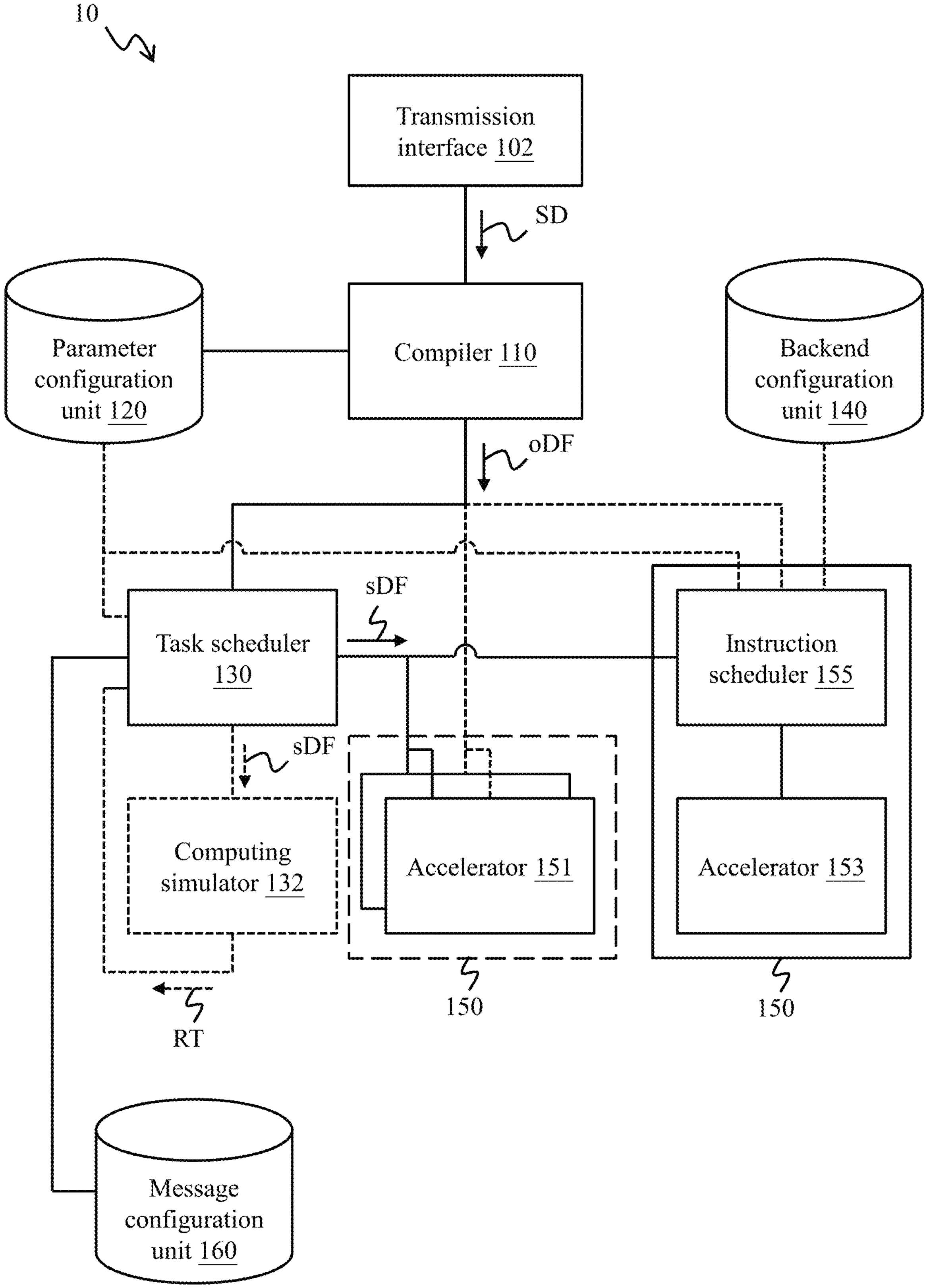
FIG. 1 is a functional block diagram of a fully homomorphic encryption (FHE) computing system according to some embodiments.

Referring to FIG. 1, a fully homomorphic encryption (FHE) computing system 10 includes a compiler 110, a task scheduler 130 and a plurality of processing modules 150. The task scheduler 130 is coupled to the compiler 110 and the processing modules 150.

The task scheduler 130 can schedule tasks between heterogeneous platforms, so that a backend can execute corresponding homomorphic encryption (HE) microinstructions on a specified platform. The processing modules 150 (i.e., heterogeneous platforms) have two or more heterogeneous processor types. In other words, the processing modules 150 are implemented by two or more different types of computing units. In some embodiments, the processing modules 150 may be implemented by two or more of various computing units such as a central processing unit (CPU), a graphic processing unit (GPU), a data processing unit (DPU), a vision processing unit (VPU), a tensor processing unit (TPU), a field-programmable gate array (FPGA), an application specific integrated circuit (ASIC), a complex instruction set computer (CISC), and a reduced instruction set computer (RISC). The compiler 110 supports a fully homomorphic encryption technology. To be specific, the compiler can compile fully homomorphic encryption data. That is, the heterogeneous processor types may be any two or more of various types, such as CPU type, GPU type, DPU type, VPU type, TPU type, FPGA type, ASIC type, CISC type, and RISC type.

Figure 2:
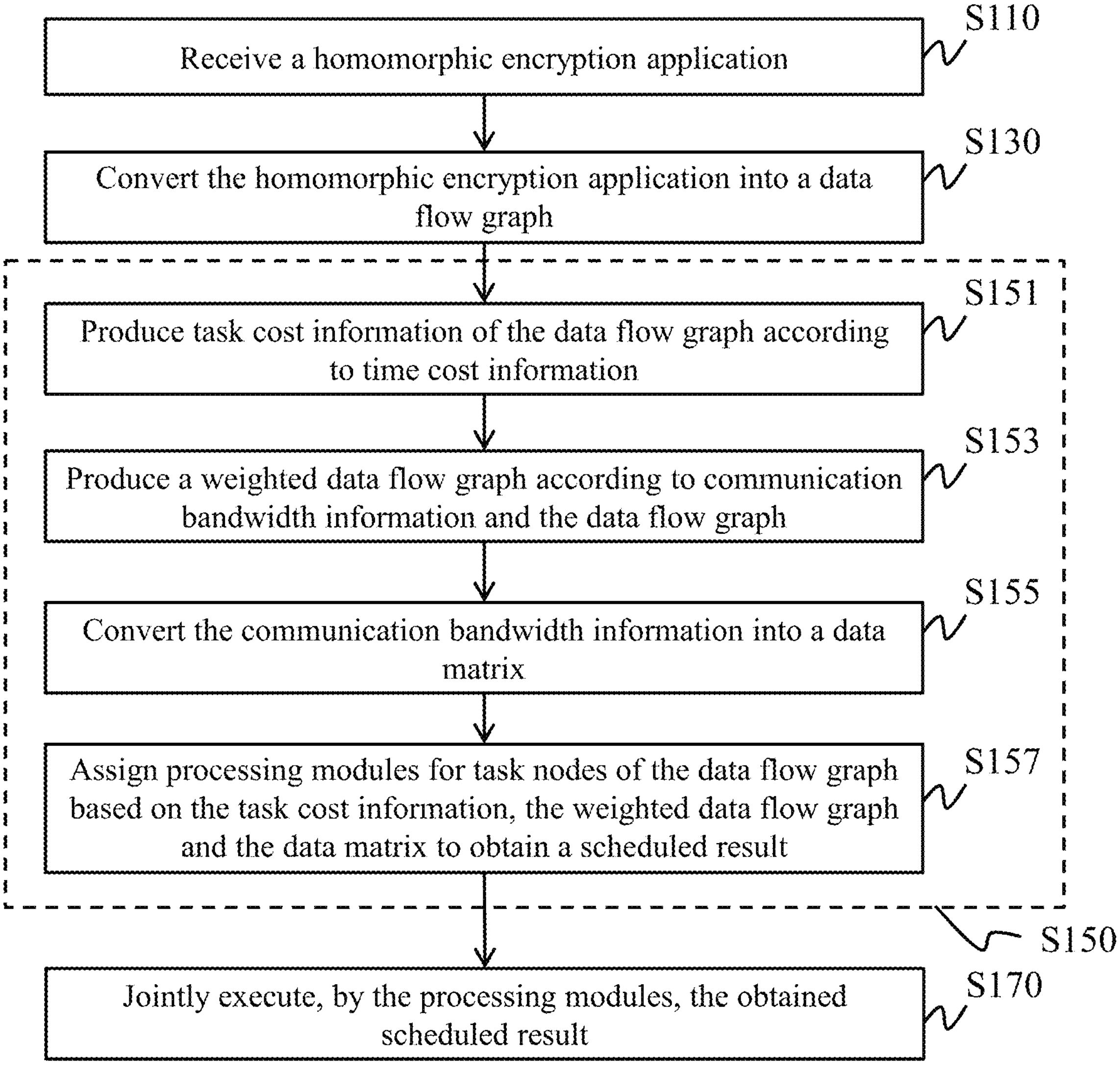
FIG. 2 is a flowchart of a fully homomorphic encryption computing method according to some embodiments.
Figure 4:
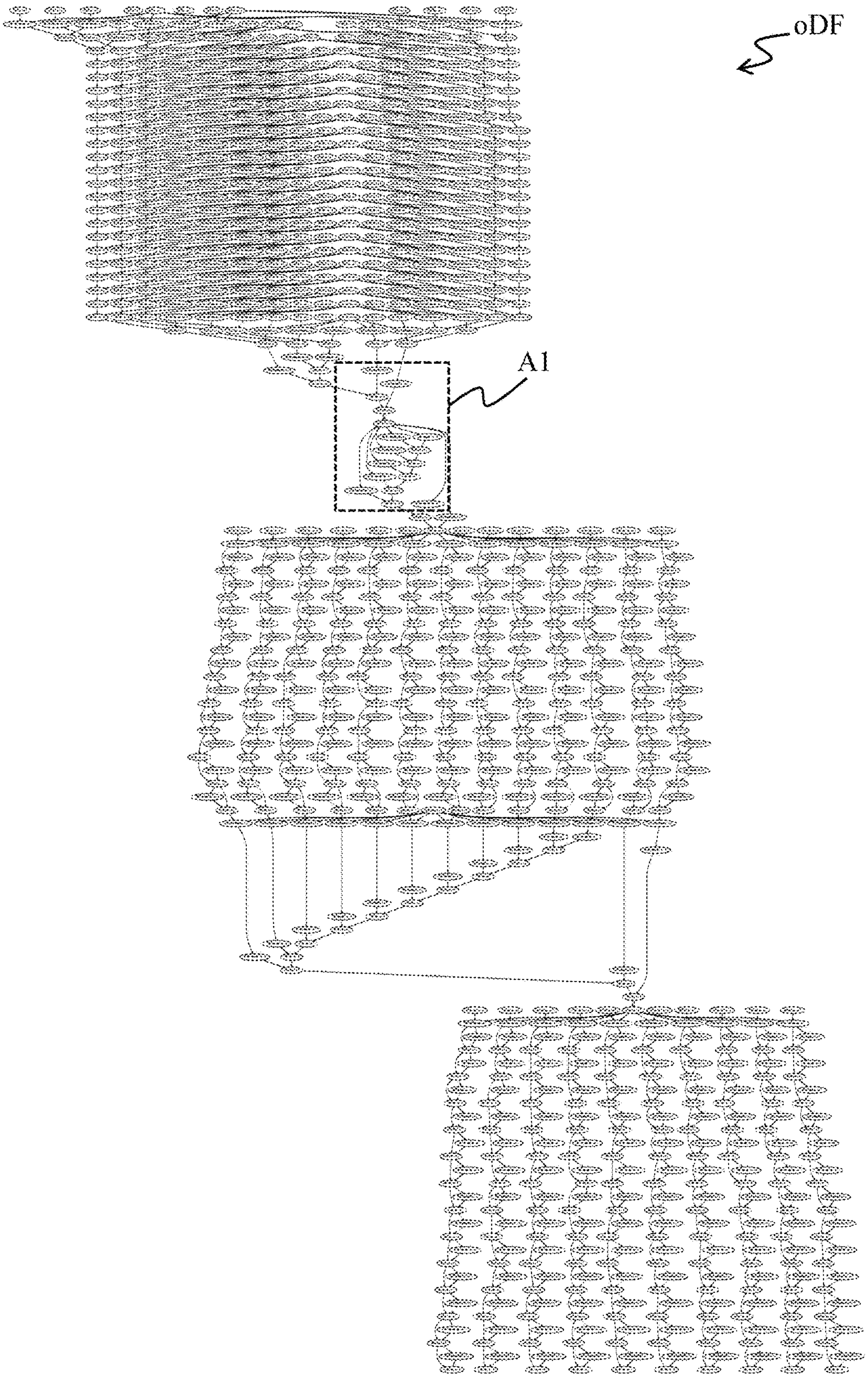
FIG. 4 is a schematic diagram of a data flow graph according to an embodiment.
Figure 5:
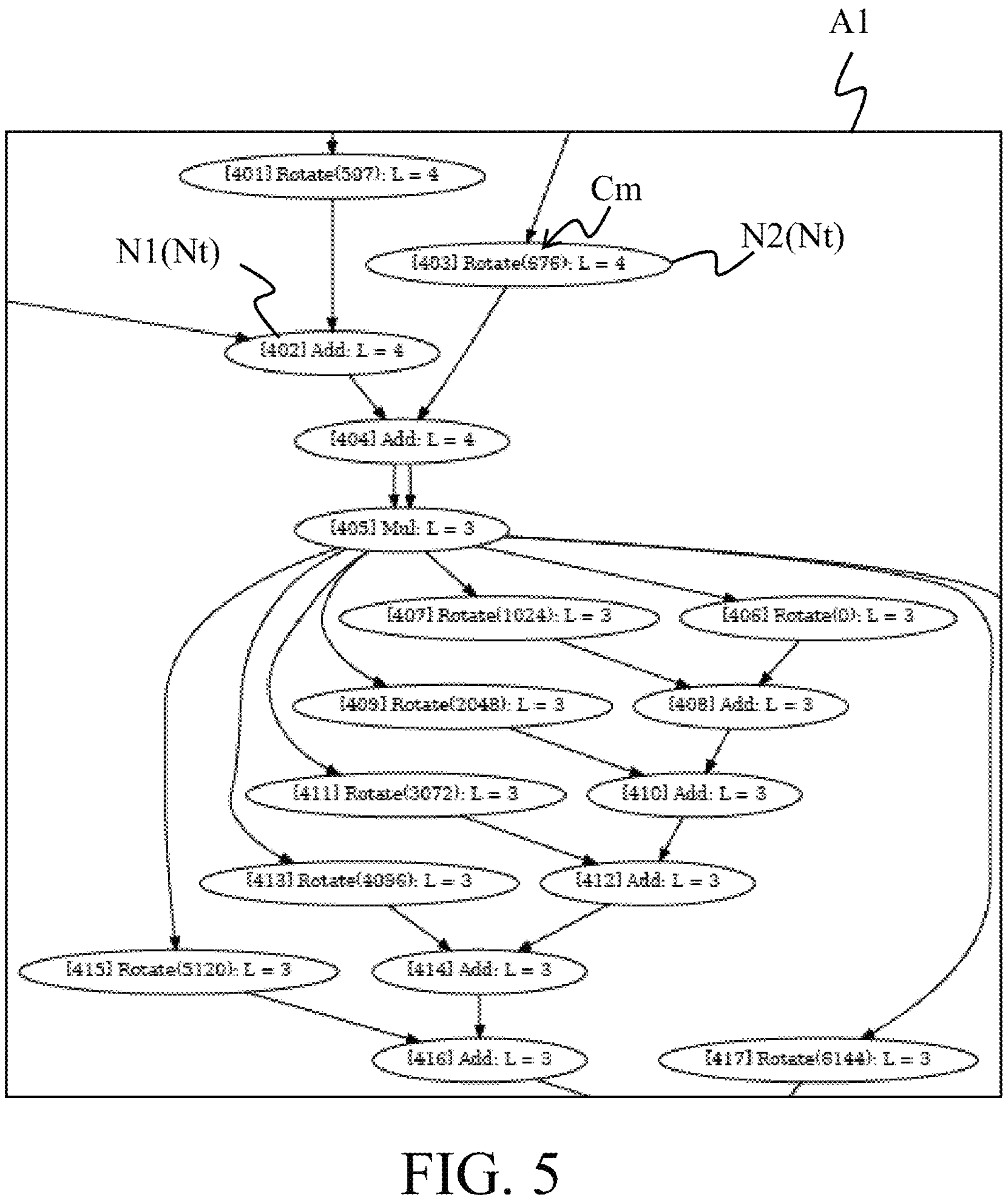
FIG. 5 is an enlarged view of block A1 in the data flow graph of FIG. 4.

Referring to FIG. 1 and FIG. 2 (or FIG. 1 and FIG. 3), the compiler 110 can receive a homomorphic encryption application SD via a transmission interface 102 (step S110), and convert the received homomorphic encryption application SD into a data flow graph (DFG) oDF (step S130). Here, the homomorphic encryption application SD includes a plurality of tasks which are executable. In other words, the data flow graph oDF includes the tasks. Specifically, the data flow graph oDF is formed by connecting task nodes Nt for the tasks to each other based on a dependency relationship between the tasks (e.g., a data flow direction between the tasks), as shown in FIG. 4 and FIG. 5. In FIG. 4 and FIG. 5, each wireframe is a task node Nt, and each task node Nt represents a task. Each task node Nt has one or more homomorphic encryption microinstructions Cm (hereinafter referred to as "instruction Cm") for completing the task and a level L of the task, which are indicated within the wireframe for the task node Nt. FIG. 5 is an enlarged view of block A1 in the data flow graph oDF of FIG. 4.

Figure 6:
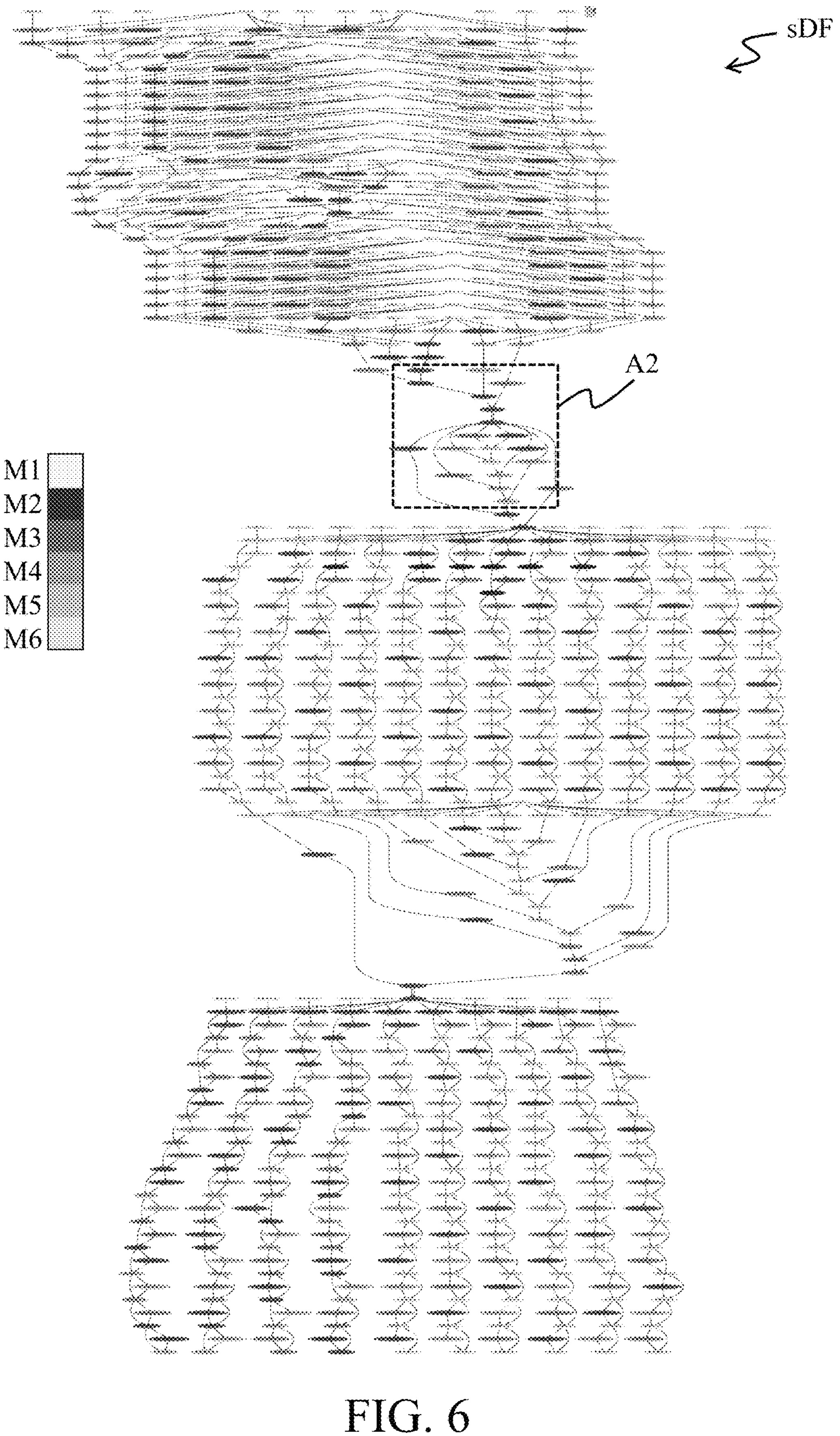
FIG. 6 is a schematic diagram of a scheduled result according to an embodiment.

Then, the task scheduler 130 performs a resource scheduling on the data flow graph oDF according to connection relationships of the processing modules 150 and execution times of the processing modules 150 to produce a scheduled result sDF (step S150). Specifically, the task scheduler 130 assigns an execution hardware for each task node Nt in the data flow graph oDF, that is, the task scheduler 130 assigns the processing modules 150 to the executable tasks of the data flow graph oDF, as shown in FIG. 6. For example, for each computing task among the tasks, the task scheduler 130 assigns one of the processing modules 150 to execute the task node Nt of the computing task. In other words, the scheduled result sDF may be the allocated data flow graph oDF where each task node Nt has been allocated to one of the processing modules 150. For example, the processing modules 150 are two processing modules 150 with CPU types (referred to, respectively, as CPU processing module 1 and CPU processing module 2) and three processing modules 150 with FPGA types (referred to, respectively, as FPGA processing module 1, FPGA processing module 2 and FPGA processing module 3). As shown in FIG. 6, in the scheduled result sDF, each task node Nt filled with color block M1 is an input node, each task node Nt filled with color block M2 is allocated to be executed by the CPU processing module 1, each task node Nt filled with color block M3 is allocated to be executed by the FPGA processing module 1, each task node Nt filled with color block M4 is allocated to be executed by the FPGA processing module 2, each task node Nt filled with color block M5 is allocated to be executed by the FPGA processing module 3, and each task node Nt filled with color block M6 is the CPU processing module 2.

Figure 7:
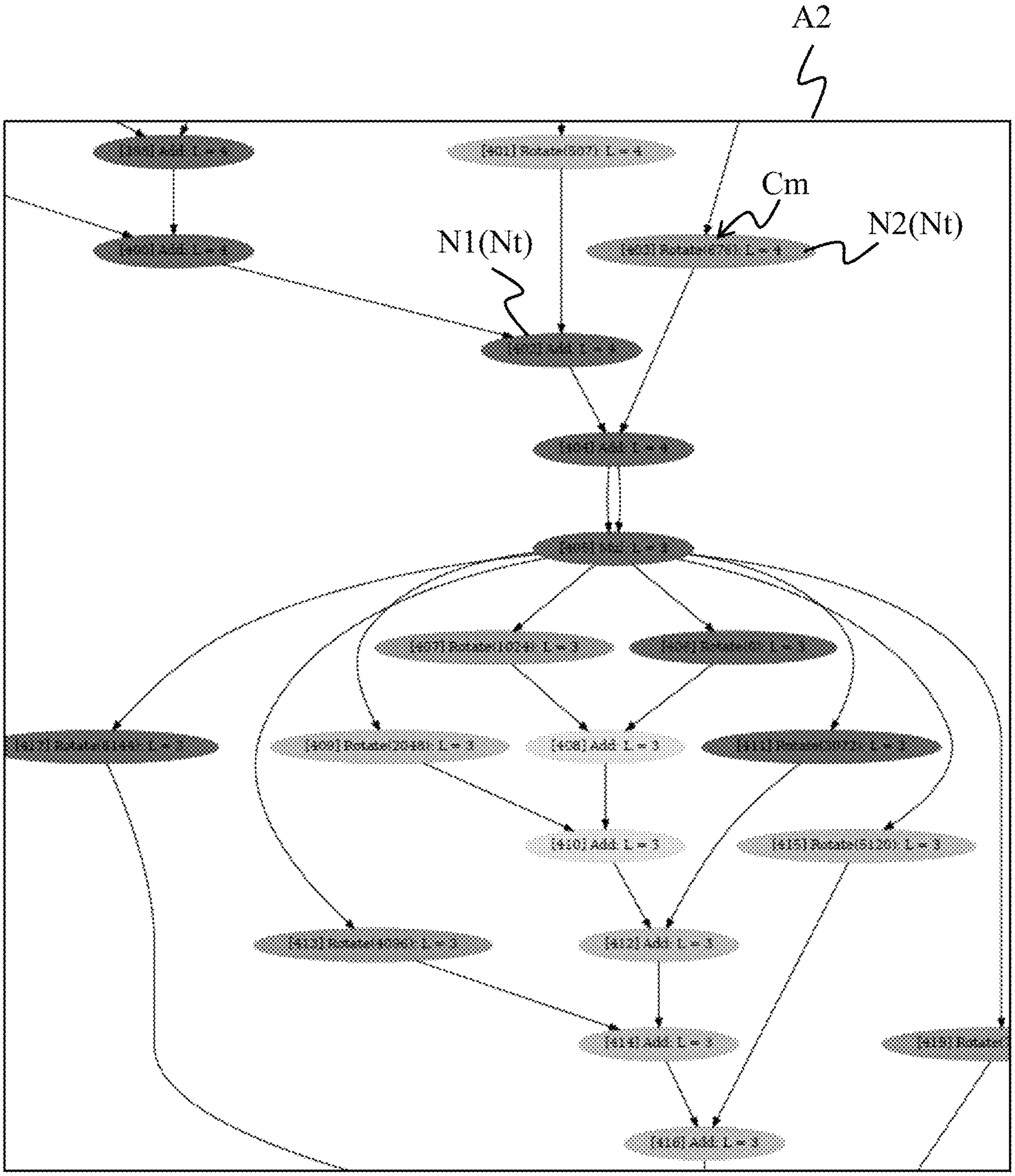
FIG. 7 is an enlarged view of block A2 in the scheduled result of FIG. 6.

In some embodiments, referring to FIG. 1 and FIG. 2, after step S150, the produced scheduled result sDF may be executed jointly by the processing modules 150 (step S170). Specifically, based on the scheduled result sDF, the instructions Cm of the task nodes Nt in the scheduled result sDF are in sequence inputted to the processing modules 150 which are assigned thereto, so that the processing modules 150 perform corresponding computing in response to the received instructions Cm. For example, following the previous example, referring to FIG. 7, according to the scheduled result sDF, during a 402nd task node N1 is executed, "add" (i.e., the instruction Cm of the task node N1 is an addition instruction) is inputted to the FPGA processing module 1, so as to cause the FPGA processing module 1 to receive data from pre-stage and execute addition computing on received data. Then, during a 403rd task node N2 is executed, "rotate" (i.e., the instruction Cm of the task node N2 is a rotation instruction) is inputted to the CPU processing module 1, so as to cause the CPU processing module 1 to receive data from pre-stage and execute rotation computing on received data. Based on this, all task nodes Nt are executed in sequence until the executions of all tasks are finished. FIG. 7 is an enlarged view of block A2 in the scheduled result sDF of FIG. 6.

In some embodiments, referring to FIG. 1, the fully homomorphic encryption computing system 10 may further include a computing simulator 132. The task scheduler 130 is further coupled between the compiler 110 and the computing simulator 132. The computing simulator 132 is configured to simulate a current hardware configuration, i.e., simulate the operations of all the processing modules 150 in the fully homomorphic encryption computing system 10.

Figure 3:
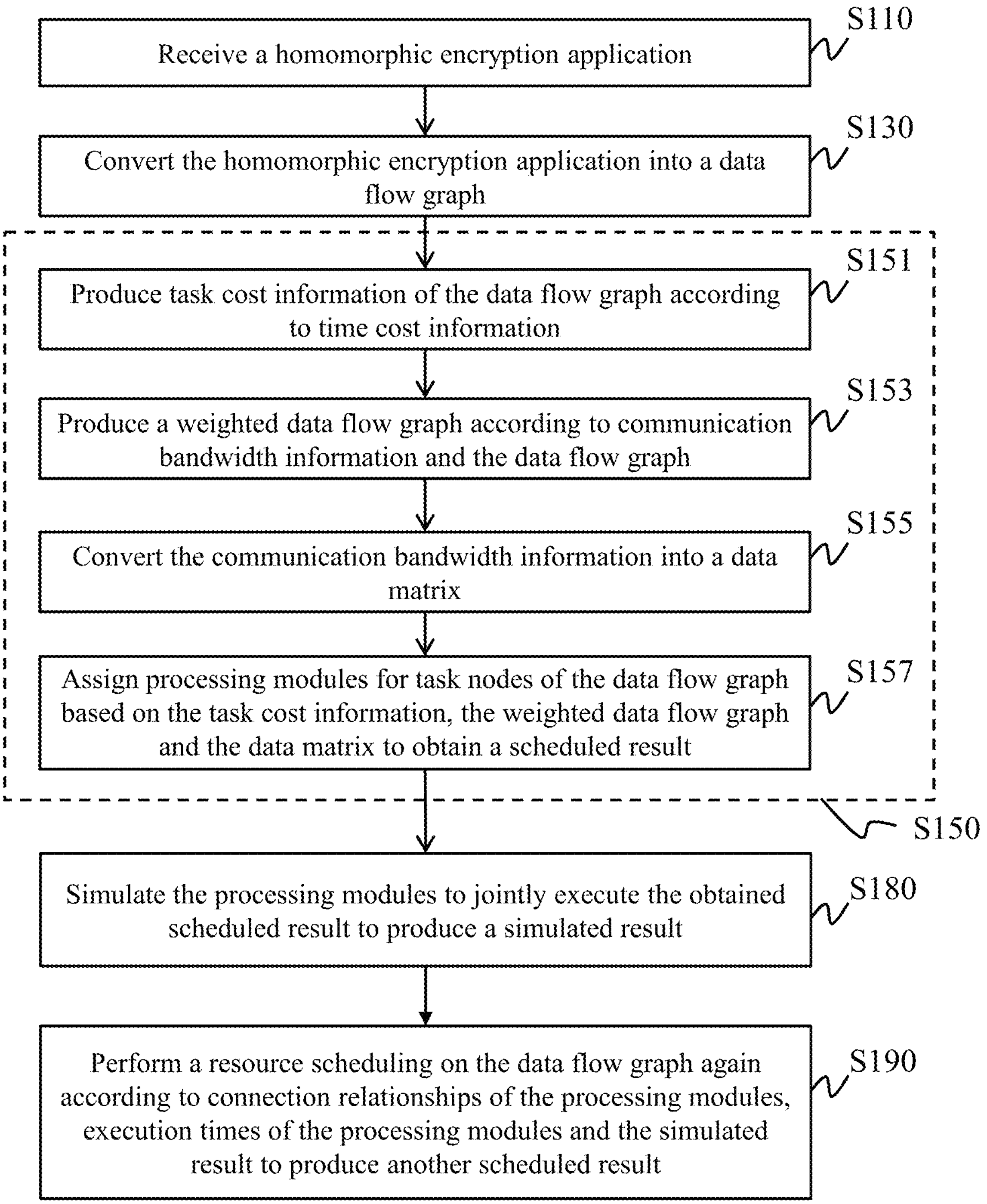
FIG. 3 is a flowchart of a fully homomorphic encryption computing method according to some other embodiments.

Specifically, referring to FIG. 1 and FIG. 3, after step S150, the produced scheduled result sDF is inputted to the computing simulator 132, so that the computing simulator 132 simulates the processing modules 150 to jointly execute the scheduled result sDF to produce a simulated result RT (step S180).

Further, after step S180, the task scheduler 130 may perform the resource scheduling on the data flow graph oDF again according to connection relationships of the processing modules 150, the execution times of the processing modules 150 and the simulated result RT to produce another scheduled result sDF (step S190). In some embodiments, the simulated result RT may be the execution time for the scheduled result sDF, which is obtained by the computing simulator 132 simulating the processing modules 150 to jointly executing the scheduled result sDF. In some other embodiments, the simulated result RT may also be a combination of the execution time of the scheduled result sDF and the scheduled result sDF.

In an example of step S190, the task scheduler 130 may first perform profile-guided optimization (PGO) with the simulated result RT to recompile a scheduling program, and then perform the resource scheduling on the data flow graph oDF again using the recompiled scheduling program based on the connection relationships of the processing modules 150 and the execution times of the processing modules 150 to obtain a new scheduled result sDF.

In some embodiments, referring to FIG. 1, the fully homomorphic encryption computing system 10 may further include a parameter configuration unit 120. The parameter configuration unit 120 is coupled to the compiler 110. The parameter configuration unit 120 stores homomorphic encryption parameters pre-configured. In step S130, the compiler 110 converts the homomorphic encryption application SD into the data flow graph oDF according to the homomorphic encryption parameters.

In some embodiments of step S130, the compiler 110 converts multiplication or addition computing between tensors in the homomorphic encryption application SD into elementwise multiplication or addition computing of vectors according to the homomorphic encryption parameters to obtain the data flow graph oDF.

In some embodiments, the parameter configuration unit 120 may also be coupled to the task scheduler 130. In step S150, the task scheduler 130 performs the resource scheduling on the data flow graph oDF according to the connection relationships of the processing modules 150, the execution times of the processing modules 150 and the homomorphic encryption parameters to produce the scheduled result sDF. During performing the resource scheduling, the task scheduler 130 may assign the processing modules 150 to all the executable tasks of the data flow graph oDF according to the connection relationships of the processing modules 150, the execution times of the processing modules 150 and the homomorphic encryption parameters.

In some embodiments, the fully homomorphic encryption computing system 10 may further include a parameter configuration unit 120 and a backend configuration unit 140. The parameter configuration unit 120 is coupled to the compiler 110. The backend configuration unit 140 is coupled to at least one of the processing modules 150. Each processing module 150 includes at least an accelerator 151 (or 153), and the backend configuration unit 140 is particularly coupled to the processing module 150 in which the accelerator 153 has a built-in memory.

The parameter configuration unit 120 stores homomorphic encryption parameters which are pre-configured. The backend configuration unit 140 stores a plurality of hardware settings of current hardware configuration, i.e. the processing modules 150 with the heterogeneous processor types. In step S130, the compiler 110 converts the homomorphic encryption application SD into the data flow graph oDF according to the homomorphic encryption parameters. Further, in step S170, the processing module 150 in which the accelerator 153 has the built-in memory reads out the stored homomorphic encryption parameters and the stored hardware settings, and jointly executes the scheduled result sDF with the other processing modules 150 according to the homomorphic encryption parameters and the hardware settings.

In some embodiments, referring to FIG. 1, FIG. 8 and FIG. 9, the processing modules 150 include one or more FPGA processing modules 150A, and each FPGA processing module 150A includes an instruction scheduler 155 and an accelerator 153 (hereinafter referred to as an FPGA accelerator 153A). The instruction scheduler 155 is coupled between the task scheduler 130 and the FPGA accelerator 153A. Further, in step S170, for the task node Nt allocated to be executed by the FPGA processing module 150A, the instruction scheduler 155 performs an instruction scheduling of the FPGA accelerator 153A according to the scheduled result sDF, and thus completes the executions of the scheduled result sDF together with the other processing modules 150.

Figure 8:
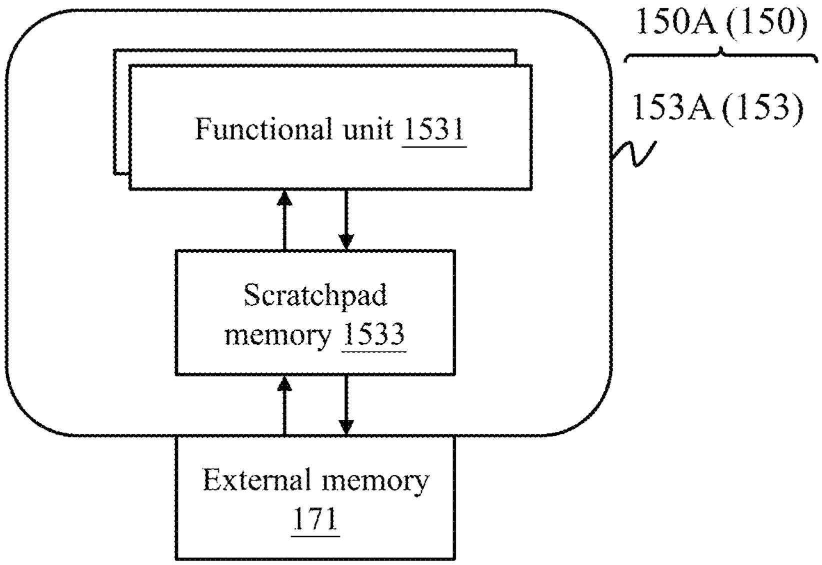
FIG. 8 is a functional block diagram of an accelerator of FIG. 1.
Figure 9:
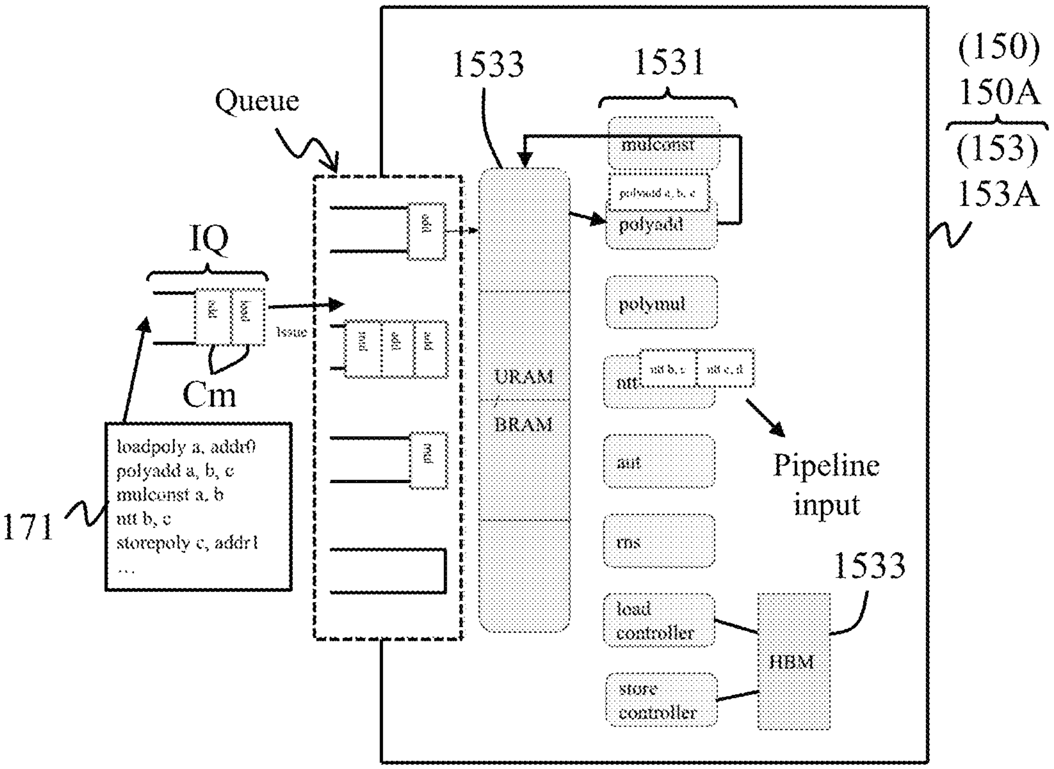
FIG. 9 is a schematic diagram of a computing state of an FPGA accelerator according to an embodiment.
Figure 10:
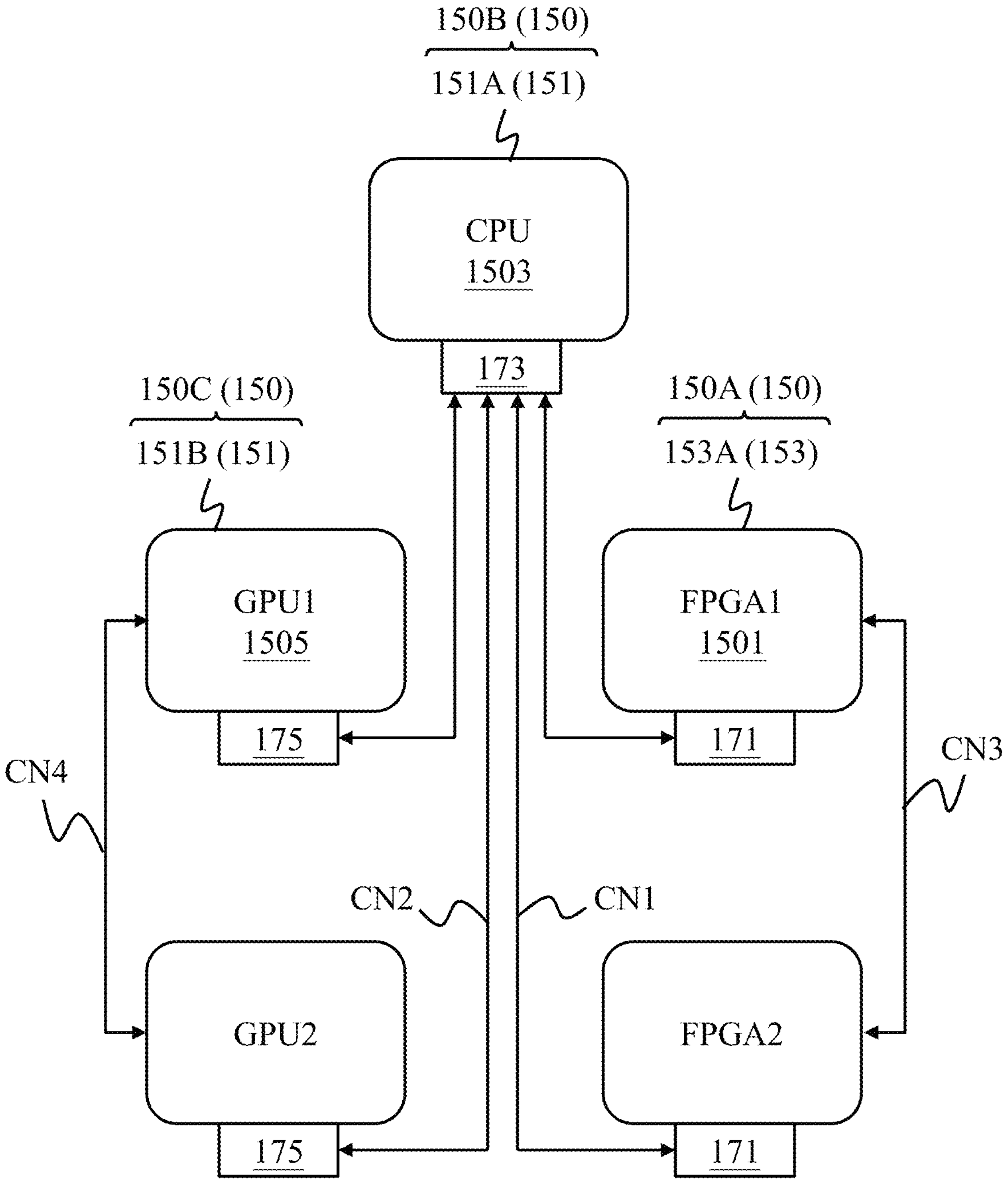
FIG. 10 is a schematic diagram of connection relationships of processing modules according to an embodiment.

Specifically, referring to FIG. 1, FIG. 8 and FIG. 9, the FPGA accelerator 153A includes one or more functional units 1531 and one or more scratchpad memories 1533. The FPGA accelerator 153 A is coupled to an external memory 171 (not shown in FIG. 1). The scratchpad memory 1533 is coupled between each functional unit 1531 and the external memory 171. In step S170, when the instructions Cm of the task nodes Nt are inputted from the external memory 171 to the FPGA accelerator 153A, the instruction scheduler 155 arranges the received instructions Cm of the task nodes Nt into an instruction queue (IQ) in sequence, and loads the instructions into the FPGA accelerator 153A in sequence. The instructions Cm loaded into the FPGA accelerator 153A are, in correspondence to the expression contents thereof, stored in the scratchpad memory 1533 or loaded into the functional unit 1531 having a corresponding computing function to execute corresponding computing or access. In some embodiments, the FPGA accelerator 153A is implemented by an FPGA (e.g., FPGA1 1501 or FPGA2), as shown in FIG. 10.

In some embodiments, the instruction scheduler 155 may be further coupled to the parameter configuration unit 120 and the backend configuration unit 140. In an example of step S170, the instruction scheduler 155 reads out the pre-configured homomorphic encryption parameters and hardware settings, and performs instruction scheduling of the FPGA accelerator 153A for the task nodes Nt (i.e., a first number of tasks) allocated to be executed by the FPGA processing module 150A in the scheduled result sDF according to the obtained homomorphic encryption parameters and the obtained hardware settings.

In some embodiments, referring to FIG. 1 and FIG. 10, the processing modules 150 may further include one or more CPU processing modules 150B, and each CPU processing module 150B is an accelerator 151 (hereinafter referred to as a CPU accelerator 151A). Specifically, the CPU accelerator 151A is implemented by a CPU 1503, and the CPU 1503 is coupled to the external memory 173. The CPU accelerator 151A is coupled to the task scheduler 130. Further, referring to FIG. 1, FIG. 2 and FIG. 10, in step S170, the instructions Cm of the task nodes Nt (i.e., a second number of tasks) allocated to be executed by the CPU processing module 150B in the scheduled result sDF are loaded from the external memory 173 to the CPU accelerator 151A, and the CPU accelerator 151A computes the corresponding instructions Cm, thereby executing the scheduled result sDF together with the other processing modules 150 (e.g., the foregoing FPGA processing module 150A).

In some embodiments, referring to FIG. 1 and FIG. 10, the processing modules 150 may further include one or more GPU processing modules 150C, and each GPU processing module 150C is another accelerator 151 (hereinafter referred to as a GPU accelerator 151B). Specifically, the GPU accelerator 151B is implemented by a GPU (e.g., GPU1 1505 or GPU2), and the GPU accelerator 151B is coupled to the external memory 175. The GPU accelerator 151B is coupled to the task scheduler 130. Further, referring to FIG. 1, FIG. 2 and FIG. 10, in step S170, the instructions Cm of the task nodes Nt (i.e., a third number of tasks) allocated to be executed by the GPU processing module 150C in the scheduled result sDF are loaded from the external memory 175 to the GPU accelerator 151B, and the GPU accelerator 151B computes the corresponding instructions Cm, thereby executing the scheduled result sDF together with the other processing modules 150 (e.g., the foregoing FPGA processing module 150A and/or CPU processing module 150B).

For example, referring to FIG. 1, FIG. 2 and FIG. 10, it is assumed that the processing modules 150 are a combination of the instruction scheduler 155 and the FPGA accelerator 153A, the CPU accelerator 151A, and the GPU accelerator 151B. In an example of step S170, the instruction scheduler 155 performs instruction scheduling of the FPGA accelerator 153A on a first number of tasks among all the executable tasks in the scheduled result sDF according to the scheduled result sDF. Therefore, the FPGA accelerator 153A executes the first number of tasks according to the instruction scheduling of the instruction scheduler 155. Meanwhile, according to the scheduled result sDF, the CPU accelerator 151A executes a second number of tasks among the rest of the executable tasks, and the GPU accelerator 151B executes a third number of tasks among the rest of the executable tasks. Therefore, the scheduled result sDF is jointly executed. The first number of tasks, the second number of tasks and the third number of tasks are not repeated.

For example, it is assumed that the homomorphic encryption application SD is a frontend code of a neural network mixed national institute of standards and technology (MNIST), and the hardware configuration is that a CPU accelerator 151A, a GPU accelerator 151B and three FPGA accelerators 153A are used as the processing modules 150. Each FPGA accelerator 153A is used in conjunction with the instruction scheduler 155.

Here, the frontend code of the neural network MNIST is shown in Table 1.

TABLE 1

```
def forward(self, x):
    x = self.conv1(x)
    x = F.relu(x)
    x = self.conv2(x)
    x = F.relu(x)
    x = F.max_pool2d(x, 2)
    x = self.dropout1(x)
    x = torch.flatten(x, 1)
    x = self.fc1(x)
    x = F.relu(x)
    x = self.dropout2(x)
    x = self.fc2(x)
    output = F.log_softmax(x, dim=1)
    return output
```

The frontend code of the neural network MNIST is fed into the compiler 110 and compiled into the data flow graph oDF shown in FIG. 4 by the compiler 110. Then, the data flow graph oDF is scheduled by the task scheduler 130 to obtain the scheduled result sDF as shown in FIG. 6.

In some embodiments, referring to FIG. 1, the fully homomorphic encryption computing system 10 may further include a message configuration unit 160. The message configuration unit 160 is coupled to the task scheduler 130. The message configuration unit 160 stores time cost information and communication bandwidth information corresponding to the current hardware configuration. The time cost information records the execution times of the various processing modules (i.e. the processing modules with various heterogeneous processor types) for various instructions Cm at various levels L, and the communication bandwidth information records a bandwidth between any two processing modules 150 of different processor types among all the processing modules 150 with the heterogeneous processor types. Referring to FIG. 1 and FIG. 2 (or FIG. 1 and FIG. 3), in an example of step S150, the task scheduler 130 performs the resource scheduling on the data flow graph oDF according to the time cost information and the communication bandwidth information, so as to assign the processing modules 150 to the tasks of the data flow graph oDF.

In some embodiments of step S150, referring to FIG. 1 and FIG. 2 (or FIG. 1 and FIG. 3), the task scheduler 130 produces task cost information of the data flow graph oDF according to the time cost information (step S151). The task cost information records the execution times for executing the task nodes Nt for all the executable tasks in the data flow graph oDF by the processing module 150 of each processor type among all the processing modules 150 with the processor type.

In some embodiments, the time cost information may be computed and stored in the message configuration unit 160 before the homomorphic encryption application SD is fed into the compiler 110. For example, following the previous example, in the time cost information, the execution times required for the processing module 150 of various processor type to execute a "rotate (rotation instruction)" at various levels L is shown in Table 2 below.

TABLE 2

| Level L | Processing module 150 | | |
|---|---|---|---|
| | CPU accelerator 151A | GPU accelerator 151B | FPGA accelerator 153A |
| 1 | 4.046000 | 0.029 | 0.007 |
| 2 | 4.607000 | 0.046 | 0.006 |
| 3 | 5.479000 | 0.064 | 0.006 |
| 4 | 6.446000 | 0.083 | 0.007 |
| 5 | 9.139000 | 0.122 | 0.007 |
| 6 | 10.750000 | 0.141 | 0.007 |
| 7 | 11.903000 | 0.164 | 0.008 |
| 8 | 13.220000 | 0.187 | 0.008 |
| | RT_ROTATE* | RT_ROTATE* | MUL_by_CONST** |
| 1 | 0.043000 | 0.003 | 0.007 |
| 2 | 0.075000 | 0.006 | 0.007 |
| 3 | 0.110000 | 0.010 | 0.008 |
| 4 | 0.148000 | 0.013 | 0.007 |
| 5 | 0.183000 | 0.017 | 0.008 |
| 6 | 0.218000 | 0.020 | 0.008 |
| 7 | 0.256000 | 0.023 | 0.010 |
| 8 | 0.299000 | 0.027 | 0.011 |

*RT_ROTATE: Execution time of plaintext rotation.
**MUL_by_CONST: Execution time of ciphertext multiplied by a constant.

Figure 11:
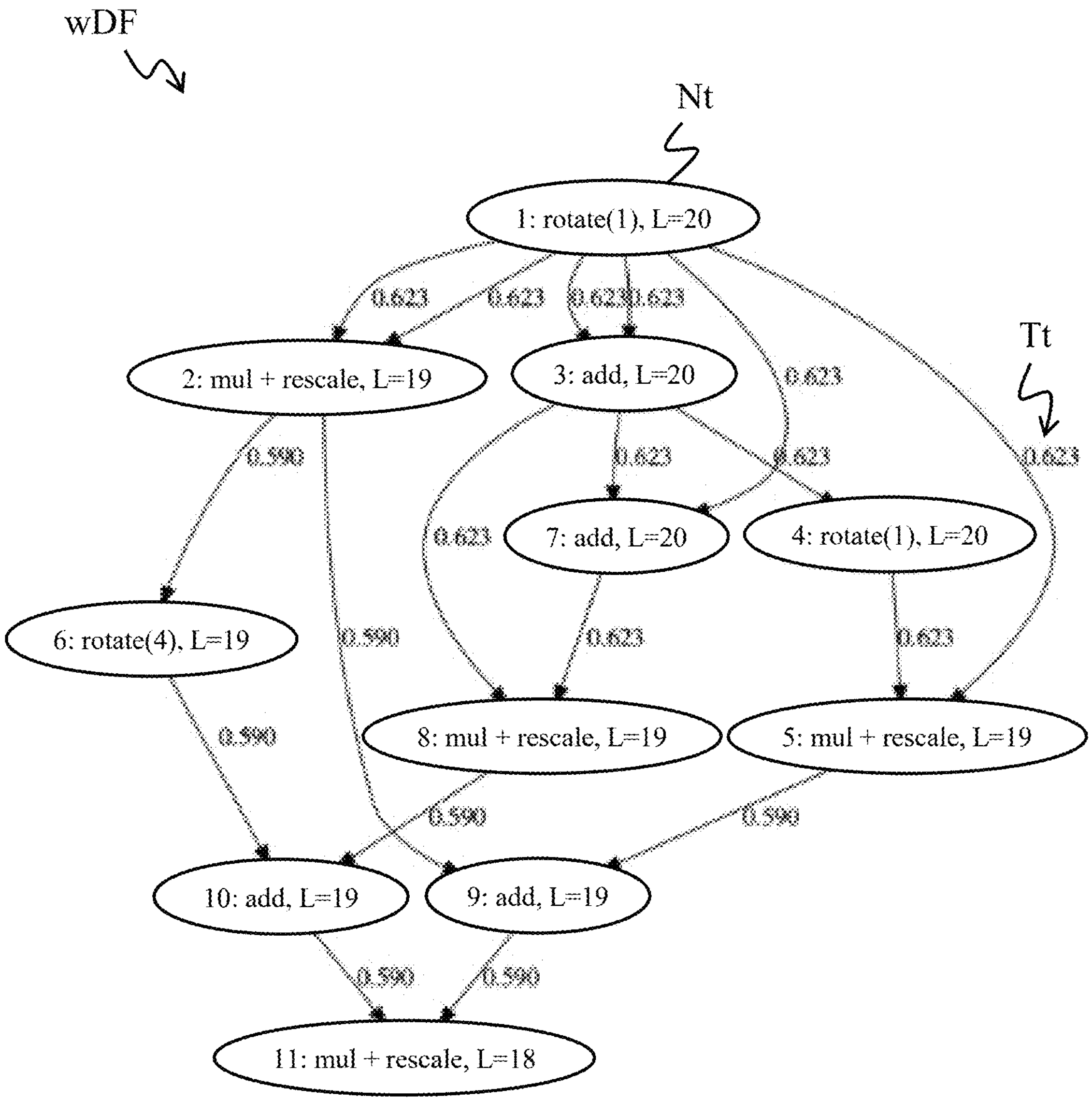
FIG. 11 is a schematic diagram of a weighted data flow graph according to an embodiment.

In an example, the task cost information may be the execution times required for various processing modules 150 in the FHE computing system 10 to execute the task nodes Nt for all the executable tasks in the data flow graph oDF according to Table 2. Take that, the processing modules 150 are the GPU accelerator 151B and the FPGA accelerator 153A, and the data flow graph oDF has 11 task nodes Nt as shown in FIG. 11, as an example. The task cost information may be shown in Table 3 below.

TABLE 3

| Task node Nt | FPGA | GPU |
|---|---|---|
| 1 | 2.56 | 3.121 |

TABLE 3-continued

| Task node Nt | FPGA | GPU |
|---|---|---|
| 2 | 2.089 | 2.658 |
| 3 | 0.140 | 0.094 |
| 4 | 2.560 | 3.212 |
| 5 | 2.089 | 2.658 |
| 6 | 2.543 | 3.061 |
| 7 | 0.140 | 0.094 |
| 8 | 2.089 | 2.658 |
| 9 | 0.133 | 0.090 |
| 10 | 0.133 | 0.090 |
| 11 | 2.096 | 2.628 |

Further, the task scheduler 130 produces a weighted DAG wDF (as shown in FIG. 11) according to the communication bandwidth information and the data flow graph oDF (step S153). The communication bandwidth information records bandwidth between any two processing modules 150 with different processor types among all the processing modules 150 with heterogeneous processor types. Referring to FIG. 11, the weighted data flow graph wDF includes all the task nodes Nt and transmission time Tt between each task node Nt and the adjacent task node Nt. For example, the communication bandwidth between the GPU processing module and the FPGA processing module is 16 GB/s, which is used as the benchmark. It is assumed that Task 1 of the first task node Nt is executed by the GPU processing module and an execution result is production of ciphertext. And, Task 2 of the second task node Nt is executed by the FPGA processing module. Herein, the size of Task 1 is the size of the ciphertext. To be specific, the size of Task 1=2*20*65536*4 Bytes=10 MB. In this case, the transmission time Tt between the first task node Nt and the second task node Nt is 10 MB/16 GB=0.6104 ms.

In some embodiments, before step S157, the task scheduler 130 further converts the communication bandwidth information into a data matrix (step S155).

For example, referring to FIG. 10, the processor types of the processing module 150 include a CPU, a GPU and an FPGA. A connection CNI between the CPU processing module 150B and the FPGA processing module 150A may adopt a PCIe3.0 technology, and the communication bandwidth therebetween is 16 GB/s. A connection CNI between the CPU processing module 150B and the GPU processing module 150C may adopt a PCIe4.0 technology, and the communication bandwidth therebetween is 32 GB/s. A connection CN3 between two FPGA processing modules 150A may adopt a QSFP technology (optical fiber technology), and the communication bandwidth therebetween is 25 GB/s. A connection CN4 between two GPU processing modules 150C may adopt an Ampere NVLink 3 technology (optical fiber technology), and at this moment, the communication bandwidth therebetween is 600 GB/s. The transmission between the GPU processing module 150C and the FPGA processing module 150A is assisted by the CPU processing module 150B. Further, the communication bandwidth information is converted into a data matrix (unit: GB/s) shown in Equation 1 below.

$$\begin{array}{c} \\ FPGA1 \\ FPGA2 \\ GPU1 \\ GPU2 \\ CPU \end{array} \begin{array}{c} \begin{array}{ccccc} FPGA1 & FPGA2 & GPU1 & CPU2 & CPU \end{array} \\ \begin{bmatrix} 0 & 25 & 48 & 48 & 16 \\ 25 & 0 & 48 & 48 & 16 \\ 48 & 48 & 0 & 600 & 32 \\ 48 & 48 & 600 & 0 & 32 \\ 16 & 16 & 32 & 32 & 0 \end{bmatrix} \end{array} \quad \text{Equation 1}$$

FPGA1 is the upper FPGA processing module 150A in FIG. 10, FPGA2 is the lower FPGA processing module 150A in FIG. 10, GPU1 is the upper GPU processing module 150C in FIG. 10, GPU2 is the lower GPU processing module 150C in FIG. 10, and CPU is the CPU processing module 150B in FIG. 10.

After obtaining the task cost information, the weighted data flow graph wDF and the data matrix, the task scheduler 130 assigns the processing modules 150 for the task nodes Nt of the data flow graph oDF based on the task cost information, the weighted data flow graph wDF and the data matrix to obtain the scheduled result sDF (step S157).

In some embodiments, the task scheduler 130 can perform the resource scheduling using an HEFT algorithm. For example, the HEFT algorithm may be implemented as a program code Pc shown in FIG. 12. The task scheduler 130 performs the resource scheduling on the tasks of the data flow graph oDF shown in FIG. 4 by executing the program code Pc shown in FIG. 12, to produce the scheduled result sDF shown in FIG. 6. Finally, the computing simulator 132 simulates that the processing modules 150 jointly execute the scheduled result sDF and accordingly produces a simulated result RT as shown in FIG. 13. In the simulated result RT, the execution time of the scheduled result sDF, which may be obtained from the simulation of the computing simulator 132, is 11.0255 ms.

In some embodiments, taking three processing modules 150 as an example, the task scheduler 130 can perform the resource scheduling on the tasks of the data flow graph oDF using the HEFT algorithm according to the following step 1 to step 3.

Step 1: Compute ranks (ranks (rd, ru)), select a maximal upper rank (ru) (i.e., compute the ranks of tasks from bottom to top and then select a maximal upper rank), and compute an earliest start time (EST) according to a current available time (P1 (FPGA1), P2 (FPGA2), P3 (GPU)) of each processing module 150 (e.g., P1, P2 and P3 as described below). The computation of ru and rd is to first judge a minimal transmission cost between parent tasks and a current task, and then add an average cost of the parent tasks (on all machines) to the transmission cost thereof, as shown in Equation 2 and Equation 3 below.

$$r_u = w_1 + \max\{c_{12} + w_2\} w \cdot r \cdot t\ R1 \quad \text{Equation 2}$$

$$r_d = w_2 + \max\{c_{12}\} w \cdot r \cdot t\ R1 \quad \text{Equation 3}$$

w1 is an average weight of the first task node Nt (i.e., an average computation time on each machine). w2 is an average weight of the second task node Nt. w.r.t is an abbreviation for with respect to. In other words, w.r.t R1 represents that Equation 1 and Equation 2 are functions that present an application in a case where the first task node Nt is a target node.

Here, if there is a parent task of the current task, EST will also be computed according to the parent task of the current task. The parent task here represents a task that needs to be completed before the parent task is executed.

Step 2: Compute an earliest finish time (EFT) based on the execution time and EST of the current task in each processing module 150.

Step 3: Iterate step 1 and step 2 until all tasks are allocated to a dispatching workflow.

Figure 14:
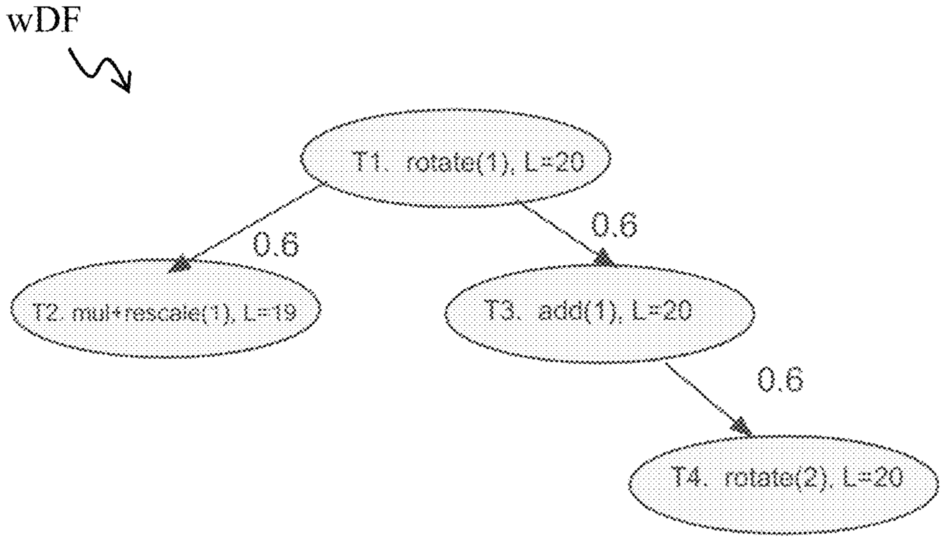
FIG. 14 is a schematic diagram of a weighted data flow graph according to another embodiment.

For example, in the weighted data flow graph wDF shown in FIG. 14, according to Equation 2 and Equation 3. ru and rd of tasks T1 to T4 can be obtained according to the following equations.

$$r_u(T_2) = w_2 = 2.2$$

$$r_u(T_4) = w_4 = 2.7$$

$$r_u(T_3) = w_3 + c_{3\to4} + w_4 = 0.1 + 0.6 + 2.7 = 3.4$$

$$r_u(T1) = w1 + \max\{c_{1\to2} + w_2, c_{1\to3} + w_3\} = 2.7 + 0.6 + 2.2 = 5.5$$

$$r_d(T2) = w_2 + c_{1\to2} = 2.2 + 0.6 = 2.8$$

$$r_d(T3) = w_3 + c_{1\to3} = 0.1 + 0.6 = 0.7$$

$$r_d(T4) = w_4 + c_{3\to4} = 2.7 + 0.6 = 3.3$$

Based on this, the values of correlation coefficients of the tasks T1 to T4 are shown in Table 4 below, and the EST and EFT thereof are shown in Table 5 below.

TABLE 4

| Task | | Processing module 150 | | | Mean | Rank | |
|---|---|---|---|---|---|---|---|
| Sequence number | Instruction Cm | P1 | P2 | P3 | wt | ru | rd |
| T1 | Rotate | 2.5 | 2.5 | 3.2 | 2.7 | 5.5 | 0 |
| T2 | Mul. | 2.0 | 2.0 | 2.6 | 2.2 | 2.2 | 2.8 |
| T3 | Add | 0.1 | 0.1 | 0.1 | 0.1 | 3.4 | 0.7 |
| T4 | Rotate | 2.5 | 2.5 | 3.2 | 2.7 | 2.7 | 3.3 |

TABLE 5

| Task | EST | | | EFT | | |
|---|---|---|---|---|---|---|
| Sequence number | P1 | P2 | P3 | P1 | P2 | P3 |
| T1 | 0 | 0 | 0 | 2.5 | 2.5 | 3.2 |
| T2 | 2.5 | 3.3 | 3.3 | 4.5 | 5.3 | 5.9 |
| T3 | 2.5 | 0 | 0 | 2.6 | 0.1 | 0.1 |
| T4 | 2.5 | 0.7 | 0.1 | 5 | 3.2 | 3.3 |

Figure 15:
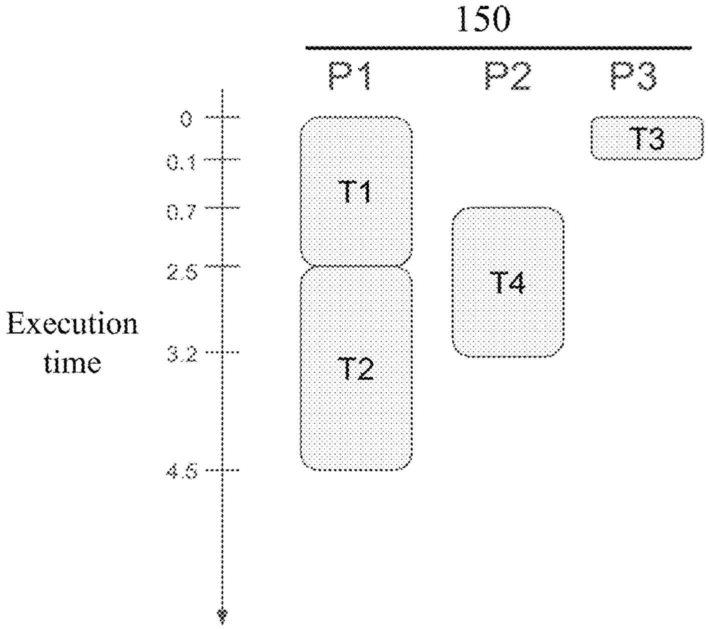
FIG. 15 is a schematic diagram of a dispatching workflow according to an embodiment.

According to Table 5, the scheduled result sDF obtained by the task scheduler 130 can be represented as the dispatching workflow shown in FIG. 15.

In some embodiments, referring to FIG. 1, the fully homomorphic encryption computing system 10 can have two operation modes, which are a heterogeneous computing mode and a homogeneous computing mode, respectively. A user may, according to actual needs, control the fully homomorphic encryption computing system 10 to switch to and work in one of the operation modes. In the fully homomorphic encryption computing system 10 with the two operation modes, the compiler 110 is further coupled to each processing module 150.

When the fully homomorphic encryption computing system 10 is switched and set to work in the heterogeneous operation mode, the fed homomorphic encryption application SD is processed according to any of the above embodiments, so as to be executed by the heterogeneous processing module 150.

When the fully homomorphic encryption computing system 10 is switched and set to work in the homogeneous operation mode, the fed homomorphic encryption application SD is translated into the data flow graph oDF and then fed into one or more processing modules 150 (which may be selected by the user) of the same processor type among the heterogeneous processing modules 150 for execution.

In an example, the execution time required to execute multiple homomorphic encryption applications SD using a specific scheduling technology and with a heterogeneous platform according to any of the embodiments is shown in Table 6 below. Here, the multiple homomorphic encryption applications SD may be, for example, MNIST (Modified National Institute of Standards and Technology database), Cifar10 (Canadian Institute for Advanced Research, 10 classes), LR (logistic regression), Bootstrapping, and other applications.

TABLE 6

| | Homomorphic encryption application SD | | | |
|---|---|---|---|---|
| System | MNIST | Cifar10 | LR | Bootstrapping |
| Native | 8.7 (1.00X) | 9123.5 (1.00X) | 316.2 (1.00X) | 436.2 (1.00X) |
| HEFT | 8.2 (1.68X) | 8767.8 (1.04X) | 235.1 (1.35X) | 185.9 (2.35X) |

Naïve refers to a scheduling technology for dispatching the tasks to be executed to idle processing modules. HEFT refers to using the fully homomorphic encryption computing system 10 shown in FIG. 1. The execution time is in seconds.

As shown in Table 6, on different homomorphic encryption applications SD, the effect of the fully homomorphic encryption computing system 10 (i.e., HEFT system) of any embodiment is better than that of a Naïve system without a specific scheduling technology. Especially on the homomorphic encryption application SD with a large data stream in Bootstrapping, the effect of the fully homomorphic encryption computing system 10 (i.e., HEFT system) of any embodiment is significantly 2.3 times better than that of the Naïve system without the specific scheduling technology.

In another example, on the basis of the architecture of the fully homomorphic encryption computing system 10 shown in FIG. 1, the execution time required to execute multiple homomorphic encryption applications SD using a single processing module 150, a plurality of homogeneous processing modules 150 and a plurality of heterogeneous processing modules 150 is tested, and the results are shown in Table 7.

TABLE 7

| | Homomorphic encryption application SD | | | |
|---|---|---|---|---|
| Processing module 150 | MNIST | Cifar10 | LR | Bootstrapping |
| 1-FPCA | 19.3 | 26524.5 | 837.0 | 688.3 |
| 1-GPU | 81.5 | 59569.4 | 1150.7 | 769.1 |
| 1-CPU + 2-FPGA | 9.6 | 12697.2 | 411.4 | 338.9 |
| 1-CPU + 4-FPGA | 5.2 | 6487.5 | 208.2 | 181.5 |
| 1-CPU + 2-GPU | 39.9 | 28677.8 | 569.8 | 381.6 |
| 1-CPU + 4-GPU | 20.7 | 14542.1 | 291.9 | 207.4 |
| 1-CPU + 1-FPGA + 3-CPU | 11.1 | 10952.2 | 256.4 | 188.7 |
| 1-CPU + 2-FPGA + 2-CPU | 8.2 | 8767.8 | 235.1 | 185.9 |
| 1-CPU + 3-FPGA + 1-CPU | 6.4 | 7362.9 | 219.3 | 176.5 |

As shown in Table 7, on different homomorphic encryption applications SD, execution effects of multiple heterogeneous processing modules 150 are better than that of a single processing module 150. By comparing a 2-FPGA group to a 2-FPGA&2-GPU group, the additional heterogeneous accelerator 151 can assist in acceleration of the execution of the homomorphic encryption application SD.

Therefore, the architecture for the fully homomorphic encryption computing system 10 of any embodiment can be applied to users with different consumption abilities, so that the fully homomorphic encryption computing system 10 with the heterogeneous processing modules 150 can be configured according to budgets and expected acceleration effects.

For example, a GPU costs NT$30,000, and an FPGA costs NT$300,000. In terms of money cost, a ratio of the FPGA to the GPU is 10:1 (FPGA: GPU=10:1), while for MNIST, a time cost ratio of the FPGA to the GPU is 1:4 (FPGA: GPU=1:4). Five hardware configurations shown in Table 8 below are observed as a function of the following Equation 4. The results show that in the case of one FPGA and three GPUs, the total cost is maximal, which is the least ideal result. The objective function contains the time cost square. Therefore, more FPGAs correspond to a smaller total cost, but other points can also be considered. In addition, if other constraints are added, the results will be different. Therefore, different objective functions will have different system configurations, thereby providing the fully homomorphic encryption computing system 10 with different hardware configurations for users with different budgets and different preferences to execute the homomorphic encryption application SD.

$$\text{Total cost} = \text{time cost}^{\wedge}2 * \text{money cost} \qquad \text{Equation 4}$$

TABLE 8

| Processing module 150 | Total cost |
|---|---|
| 4-FPGA + 0-GPU | (Money cost, time cost) = (1200000, 1/(4*4 + 0*1)) = 0.46 |
| 3-FPGA + 1-GPU | (Money cost, time cost) = (1200000, 1/(3*4 + 1*1)) = 0.55 |
| 2-FPGA + 2-GPU | (Money cost, time cost) = (1200000, 1/(2*4 + 2*1)) = 0.66 |
| 1-FPGA + 3-GPU | (Money cost, time cost) = (1200000, 1/(1*4 + 3*1)) = 0.79 |
| 0-FPGA + 4-GPU | (Money cost, time cost) = (1200000, 1/(0*4 + 4*1)) = 0.75 |

In some embodiments, the fully homomorphic encryption computing system 10 may be implemented on a single computer or multiple computers located within the same local area network.

In some embodiments, the compiler 110 may be implemented by a compiler such as encrypted vector arithmetic (EVA), CHET, or nGraph-HE.

In some embodiments, the homomorphic encryption application SD may be a data stream composed of elements that implement an executable program for a particular application purpose. The specific application purpose may require, for example, resistance to quantum attacks, support for basic arithmetic computing on encrypted data (e.g., addition, multiplication, etc.), and/or support for logical operations on encrypted data (e.g., rotation, etc.). Some other quantum resistance algorithms (e.g., AES256) do not support logical operations including rotation on the encrypted data. For example, pancreatic tumor segmentation, face image detection, and other applications requiring real-time response are suitable for integration with the fully homomorphic encryption (FHE) computing system 10 of any embodiment when privacy is a critical issue.

In some embodiments, the task scheduler 130 and/or the computing simulator 132 may be implemented using one or more computing units in conjunction with firmware or software that implements the corresponding functions. Each computing unit may be, for example, a microprocessor, a microcontroller, a digital signal processor (DSP), a CPU, a GPU, a DPU, a VPU, a TPU, an FPGA, an ASIC, a CISC, a RISC, a programmable logic controller (PLC), a finite-state machine (FSM), or the like.

In some embodiments, the transmission interface 102 may be a network module, for example, a wireless network card, an Ethernet card, a Bluetooth chip, a radio frequency chip, or a communication chip.

In some embodiments, the scratchpad memory 1533 may be a high bandwidth memory (HBM) module, a unified random access memory (URAM), a block random access memory (BRAM), a hybrid memory cube (HMC) memory module, a solid state drive (SSD), a static random access memory (SRAM), a phase-change random access memory (PRAM, or PCRAM), a resistive random access memory (RRAM, or ReRAM), a conductive-bridging RAM (CBRAM), a magnetic RAM (MRAM), or a spin-transfer torque MRAM (STT-MRAM).

In some embodiments, the parameter configuration unit 120, the backend configuration unit 140, the message configuration unit 160, and the external memories 171, 173, 175 may be implemented by one or more memories.

Furthermore, the fully homomorphic encryption computing method of any embodiment may be implemented by a computer program product, so that steps S110 to S150, or steps S110 to S170, or steps S110 to S190 can be performed when a host loads at least one program and executes the program. In some embodiments, the computer program product may be a non-transitory computer-readable medium, and the program is stored in the non-transitory computer-readable medium for loading by the host. In some embodiments, the program may be a computer program product and is transmitted to the host via a wired or wireless manner.

In summary, according to any embodiment, the fully homomorphic encryption computing method, the fully homomorphic encryption computing system 10 or the non-transitory computer-readable medium therefor is applied to support multi-platform heterogeneous computing, thereby ensuring that efficient FHE computing can be implemented in different scenarios. In some embodiments, the fully homomorphic encryption computing method, the fully homomorphic encryption computing system 10 or the non-transitory computer-readable medium therefor employs a customized task scheduling algorithm to intelligently allocate computing tasks to different platforms in the fully homomorphic encryption computing system 10 in consideration of a data transmission time and computing capabilities of the different platforms, thereby minimizing a computing time for application performance. In some embodiments, the fully homomorphic encryption computing method, the fully homomorphic encryption computing system 10 or the non-transitory computer-readable medium therefor supports highly scalable FHE applications and implements advanced FHE function libraries on the different platforms. Therefore, secure computing can be easily implemented in deep learning, linear algebra or other application fields. In some embodiments, the fully homomorphic encryption computing method, the fully homomorphic encryption computing system 10 or the non-transitory computer-readable medium therefor improves application flexibility and accessibility while maintaining high efficiency compared to dedicated FHE hardware accelerators, and can effectively reduce computing delays by dispersing FHE computing across heterogeneous platforms, while ensuring greater flexibility and availability of FHE in modern applications.

What is claimed is:

1. A fully homomorphic encryption computing system for improving an efficiency of FHE computing, comprising:

a compiler, configured to receive a homomorphic encryption application and convert the homomorphic encryption application into a data flow graph, wherein the data flow graph is a listing of a plurality of tasks;

a plurality of processing modules, coupled to the compiler, and having at least two heterogeneous processor types; and a task scheduler, coupled to the compiler, and configured to produce task cost information for the plurality of tasks listed in the data flow graph and perform a resource scheduling on the plurality of tasks listed in the data flow graph according to execution times and connection relationships of the plurality of processing modules to produce a scheduled result that assigns processing module utilized for each scheduled task by selecting the module with the lowest task cost information and execution time and without conflict for the connection relationships from the plurality of processing modules, such that the assigned processing modules to jointly execute the plurality of tasks listed in the data flow graph when the connection relationships does not conflict according to the scheduled result, to output homomorphic encryption operations for the homomorphic encryption application;

a parameter configuration unit, configured to store a plurality of homomorphic encryption parameters; and a backend configuration unit, configured to store a plurality of hardware settings;

wherein the plurality of processing modules comprise an FPGA processing module, and the FPGA processing module comprises:

an FPGA accelerator; and an instruction scheduler, coupled between the FPGA accelerator and one of the compiler and the task scheduler, coupled to the parameter configuration unit and the backend configuration unit, and configured to perform an instruction scheduling of the FPGA accelerator according to the plurality of homomorphic encryption parameters, the plurality of hardware settings, and one of the data flow graph and the scheduled result.

2. The fully homomorphic encryption computing system according to claim 1, wherein the compiler is coupled to the parameter configuration unit, and is configured to convert the homomorphic encryption application into the data flow graph according to the plurality of homomorphic encryption parameters.

3. The fully homomorphic encryption computing system according to claim 2, wherein the parameter configuration unit is further coupled to the task scheduler, and the task scheduler is configured to assign the plurality of processing modules to tasks of the data flow graph according to the connection relationships of the plurality of processing modules, the execution times of the plurality of processing modules and the plurality of homomorphic encryption parameters to produce the scheduled result.

4. The fully homomorphic encryption computing system according to claim 1, further comprising:

a message configuration unit, coupled to the task scheduler, and configured to store time cost information and communication bandwidth information, wherein the time cost information records the execution times of processing modules with various processor types for various instructions at various levels, the communication bandwidth information records a bandwidth between any two processing modules with different processor types among the plurality of processing modules with the at least two heterogeneous processor types, and the task scheduler is configured to produce the task cost information for the plurality of tasks listed in the data flow graph according to the time cost information and the communication bandwidth information.

5. The fully homomorphic encryption computing system according to claim 1, wherein the at least two heterogeneous processor types are selected from at least two types of the group consisting of a central processing unit (CPU) type, a graphic processing unit (GPU) type, a data processing unit (DPU) type, a vision processing unit (VPU) type, a tensor processing unit (TPU) type, a field-programmable gate array (FPGA) type, an application specific integrated circuit (ASIC) type, a complex instruction set computer (CISC) type, and a reduced instruction set computer (RISC) type.

6. The fully homomorphic encryption computing system according to claim 1, wherein the plurality of processing modules further comprise:

at least one of a CPU accelerator and a GPU accelerator, coupled to one of the compiler and the task scheduler.

7. The fully homomorphic encryption computing system according to claim 1, further comprising:

a computing simulator, coupled to the task scheduler, and configured to simulate the plurality of processing modules to jointly execute the scheduled result to produce a simulated result, wherein the task scheduler is further configured to perform the resource scheduling on the data flow graph again according to the connection relationships of the plurality of processing modules, the execution times of the plurality of processing modules and the simulated result to produce another scheduled result.

8. A fully homomorphic encryption computing method for improving an efficiency of FHE computing, comprising:

receiving a homomorphic encryption application;

converting the homomorphic encryption application into a data flow graph, wherein the data flow graph is a listing of a plurality of tasks;

producing task cost information for the plurality of tasks listed in the data flow graph;

performing a resource scheduling on the data flow graph according to execution times and connection relationships of the plurality of processing modules to produce a scheduled result that assigns processing module utilized for each scheduled task by selecting the module with the lowest task cost information and execution time and without conflict for the connection relationships from the plurality of processing modules, such that the assigned processing modules to jointly execute the plurality of tasks listed in the data flow graph when the connection relationships does not conflict according to the scheduled result, to output homomorphic encryption operations for the homomorphic encryption application, wherein the plurality of processing modules have at least two heterogeneous processor types, the plurality of processing modules comprise an FPGA processing module, and the FPGA processing module comprises an instruction scheduler and an FPGA accelerator; and perform, by the instruction scheduler, an instruction scheduling of the FPGA accelerator according to the plurality of homomorphic encryption parameters, the plurality of hardware settings, one of the data flow graph, and the scheduled result.

9. The fully homomorphic encryption computing method according to claim 8, further comprising:

jointly executing, by the plurality of processing modules, a plurality of tasks of the scheduled result.

10. The fully homomorphic encryption computing method according to claim 9, wherein the step of jointly executing, by the plurality of processing modules, the plurality of tasks of the scheduled result comprises:

executing, by the FPGA accelerator, a first number of tasks according to the instruction scheduling.

11. The fully homomorphic encryption computing method according to claim 10, wherein the plurality of processing modules further comprise a CPU accelerator, and the step of jointly executing, by the plurality of processing modules, the plurality of tasks of the scheduled result further comprises:

executing, by the CPU accelerator, a second number of tasks among the rest of the plurality of tasks according to the scheduled result.

12. The fully homomorphic encryption computing method according to claim 11, wherein the plurality of processing modules further comprise a GPU accelerator, and the step of jointly executing, by the plurality of processing modules, the plurality of tasks of the scheduled result further comprises:

executing, by the GPU accelerator, a third number of tasks among the rest of the plurality of tasks according to the scheduled result.

13. The fully homomorphic encryption computing method according to claim 8, further comprising:

simulating the plurality of processing modules to jointly execute the scheduled result to produce a simulated result; and performing the resource scheduling on the data flow graph again according to the connection relationships of the plurality of processing modules, the execution times of the plurality of processing modules and the simulated result to re-produce another scheduled result.

14. The fully homomorphic encryption computing method according to claim 8, wherein the step of converting the homomorphic encryption application into the data flow graph comprises:

reading out a plurality of homomorphic encryption parameters pre-configured; and converting the homomorphic encryption application into the data flow graph according to the plurality of homomorphic encryption parameters.

15. The fully homomorphic encryption computing method according to claim 14, wherein the step of converting the homomorphic encryption application into the data flow graph according to the plurality of homomorphic encryption parameters comprises:

converting multiplication or addition computing between tensors in the homomorphic encryption application into elementwise multiplication or addition computing of vectors according to the plurality of homomorphic encryption parameters to obtain the data flow graph.

16. The fully homomorphic encryption computing method according to claim 8, wherein the step of producing the task cost information comprises:

producing the task cost information for the plurality of tasks listed in the data flow graph according to time cost information, wherein the time cost information records the execution times of processing modules with various processor types for various instructions at various levels, and the task cost information records the execution times for executing the plurality of task nodes by the processing module of each processor type among the plurality of processing modules with the at least two heterogeneous processor types; wherein the fully homomorphic encryption computing method further comprises:

producing a weighted data flow graph according to communication bandwidth information and the data flow graph, wherein the communication bandwidth information records a bandwidth between any two processing modules with different processor types among the plurality of processing modules with the at least two heterogeneous processor types, and the weighted data flow graph comprises all task nodes and a transmission time between each task node and adjacent task node among the plurality of task nodes; and converting the communication bandwidth information into a data matrix; and wherein the step of performing the resource scheduling on the data flow graph comprises:

allocating the plurality of processing modules with the at least two heterogeneous processor types for the plurality of tasks listed in the data flow graph based on the task cost information, the weighted data flow graph and the data matrix to obtain the scheduled result.

17. A non-transitory computer-readable medium, storing at least one program so that a computer loads and executes the at least one program to implement the fully homomorphic encryption computing method according to claim 8.

* * * * *